C. S. STOY.
Gasket.

No. 196,398.  Patented Oct. 23, 1877.

WITNESSES:
E. Wolff
J. H. Scarborough

INVENTOR:
C. S. Stoy
BY Munn & Co.
ATTORNEYS.

N. PETERS, PHOTO-LITHOGRAPHER, WASHINGTON, D C.

UNITED STATES PATENT OFFICE.

CYRUS S. STOY, OF BUTLER, INDIANA.

IMPROVEMENT IN GASKETS.

Specification forming part of Letters Patent No. 196,398, dated October 23, 1877; application filed September 10, 1877.

*To all whom it may concern:*

Figure 1:
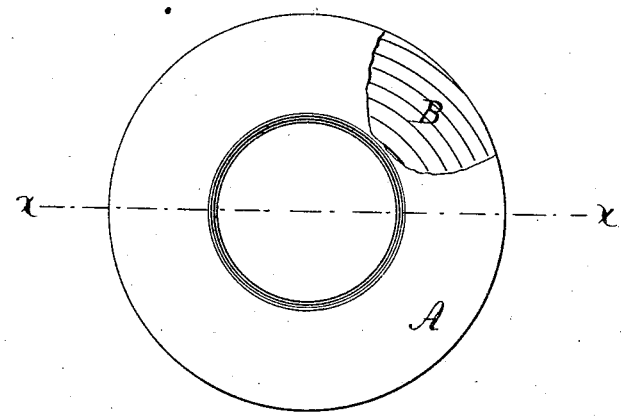
Figure 2:
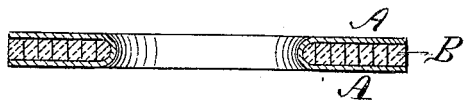

Be it known that I, CYRUS S. STOY, of Butler, in the county of De Kalb and State of Indiana, have invented a new and Improved Gasket, of which the following is a specification:

Figure 1 is a face view of my improved gasket, with a portion broken away to show internal parts. Fig. 2 is a transverse section on line $x\ x$ in Fig. 1.

Similar letters of reference indicate corresponding parts.

My invention relates to gaskets for packing joints of pipes, hand-holes, and other similar places; and it consists of two thin annular metallic plates, joined together at their inner edges, having a space between them for a coil of packing.

In the drawing, A A are thin annular plates, having formed on their inner edges lips or ledges, by which they are united, so as to leave a thin space between them for receiving the elastic packing B, which consists of a strip of rubber wound spirally in the space between the two plates.

Any description of elastic packing may be employed in filling the space between the plates.

Both of the annular plates may be made from a single sheet of metal by the process of spinning.

This gasket, when clamped between pipe-flanges or between hand-hole covers and their seats, forms a tight joint, which cannot blow out.

The packing is protected by the metallic covering, so that it is not acted upon by steam or fluids or gas.

If from any cause the joint should leak, it may be easily tightened by calking from the outside of the joint.

In taking the joint apart, there being no part of the elastic packing in contact with the face of the joint, it may be readily removed without tearing or injury, and may be used many years without renewing.

Having thus described my invention, what I claim as new, and desire to secure by Letters Patent, is—

The packing-gasket herein described, consisting of two annular plates, A, united together at their inner edges and open at their outer edges, so as to form an intermediate space containing an elastic coiled filling, B, as and for the purpose set forth.

CYRUS SAMUEL STOY.

Witnesses:
WILLIAM T. BOPE,
GEORGE W. MAXWELL.